(12) United States Patent
Vos et al.

(10) Patent No.: US 8,520,061 B2
(45) Date of Patent: Aug. 27, 2013

(54) ZERO-D DIMMING FOR 3D DISPLAYS

(75) Inventors: Martin J. Vos, Minneapolis, MN (US); Glenn E. Casner, Woodbury, MN (US)

(73) Assignee: 3M Innovative Properties Company, Saint Paul, MN (US)

(*) Notice: Subject to any disclaimer, the term of this patent is extended or adjusted under 35 U.S.C. 154(b) by 565 days.

(21) Appl. No.: 12/637,327

(22) Filed: Dec. 14, 2009

(65) Prior Publication Data
US 2011/0141244 A1    Jun. 16, 2011

(51) Int. Cl.
*H04N 13/04* (2006.01)

(52) U.S. Cl.
USPC ............. 348/51; 348/42; 348/46; 348/47; 348/E13.014; 345/211; 382/154; 359/465

(58) Field of Classification Search
USPC ................... 345/211; 359/465; 348/51
See application file for complete search history.

(56) References Cited

U.S. PATENT DOCUMENTS

| | | | |
|---|---|---|---|
| 5,717,522 A * | 2/1998 | Hattori et al. | 359/465 |
| 6,215,899 B1 * | 4/2001 | Morimura et al. | 382/154 |
| 6,762,742 B2 | 7/2004 | Moon et al. | |
| 7,528,893 B2 | 5/2009 | Schultz et al. | |
| 2001/0035853 A1 | 11/2001 | Hoelen et al. | |
| 2004/0113906 A1 * | 6/2004 | Lew et al. | 345/211 |
| 2005/0104839 A1 | 5/2005 | Baik | |
| 2006/0209005 A1 | 9/2006 | Pedram et al. | |
| 2008/0111502 A1 | 5/2008 | Kim et al. | |
| 2009/0167639 A1 | 7/2009 | Casner et al. | |
| 2009/0256492 A1 | 10/2009 | Lee et al. | |

* cited by examiner

*Primary Examiner* — Kyung H Shin

(57) ABSTRACT

A method of zero-D dimming backlights for 3D or multi-view displays using right and left image data. The method receives right and left pixel luminance values for the right and left image data, and it remaps the right and left pixel luminance values using a factor based upon an average luminance value or based upon a luminance percentile value or a modified factor that further includes the absolute difference between left and right pixel luminance values. The factor or modified factor are selectively used to remap particular right and left pixel luminance values based upon a disparity consideration. The method results in power savings by dimming the backlight without perceptible or substantial loss in brightness of the display.

10 Claims, 2 Drawing Sheets

ZERO-D DIMMING FOR 3D DISPLAYS

BACKGROUND

Typical zero-D backlight dimming transforms (remaps) or opens the pixels of a liquid crystal display (LCD) such that a dimmed backlight plus transformed image results in a similar brightness perception compared to a 100% on backlight and normal image. The advantage of this zero-D dimming is backlight power savings, an important benefit in portable battery operated displays. Pixel correction algorithms have been developed to implement zero-D dimming. These algorithms involve statistical analysis of pixel brightness and can be based on, for example, average frame luminance or luminance percentile statistics. The power savings capability with these algorithms has been experimentally demonstrated and can be as much as threefold while still maintaining reasonable display brightness perception. However, these algorithms have been developed for use with single view displays.

Accordingly, a need exists for zero-D dimming for 3D or multi-view displays.

SUMMARY

A method, consistent with the present invention, provides zero-D dimming for a display using right and left image data. The method includes receiving right image data having right pixel luminance values and left image data having left pixel luminance values. The right and left pixel luminance values are modified using a first factor based upon an average or a percentile statistics based luminance value and a second factor based upon differences between the right pixel luminance values and the left pixel luminance values. The modifying step includes selectively using the first factor or second factor considering an analysis of possible disparity reduction.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of the present invention include a method of uniform or zero-D dimming of backlights for 3D displays that maintains disparity information between luminance of right and left image data.

3D Displays

Figure 1:
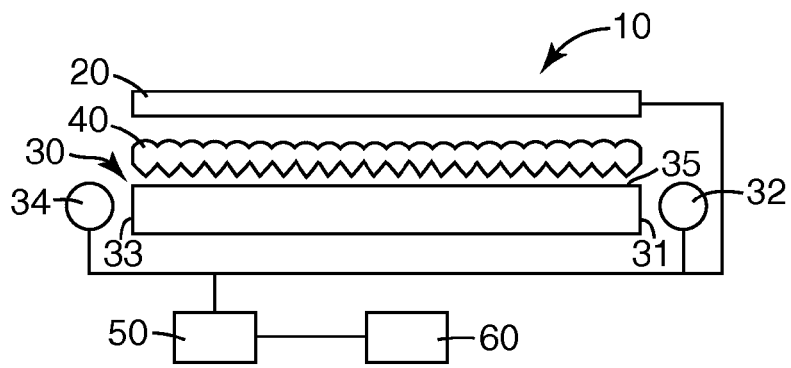
FIG. 1 is a schematic side view of an illustrative display apparatus.

FIG. 1 is a schematic side view of an illustrative 3D autostereoscopic display apparatus 10. The display apparatus includes an LCD panel 20 having a required frame response time and a backlight 30 positioned to provide light to the LCD panel 20. The backlight 30 includes a right eye image solid state light source 32 and a left eye image solid state light source 34 capable of being modulated between light sources 32 and 34 at a rate of at least 90 Hertz. Backlight 30 includes a light guide 35 having an edge 33 for receiving light from light source 34 and an edge 31 for receiving light from light source 32. Light sources 32 and 34 can be implemented with, for example, light emitting diodes (LEDs). A double sided prism film 40 having prisms on one side and lenslets on the other is disposed between the LCD panel 20 and the backlight 30.

A synchronization driving element 50 is electrically connected to the backlight 30, light sources 32 and 34, and the LCD panel 20. The synchronization driving element 50 synchronizes activation and deactivation (modulation) of the right eye image solid state light source 32 and the left eye image solid state light source 34 as image frames are provided at a rate of 90 frames per second or greater to the LCD panel 20 to produce a flicker-free video or rendered computer graphics. An image source 60 is connected to the synchronization driving element 50 and provides the images frames (right eye images and left eye images) to the LCD panel 20. The image provided by image source 60 can include video or computer rendered graphics. The synchronization driving element 50 can include a video interface such as, for example, a Westar VP-7 video adaptor (Westar Display Technologies, Inc., St. Charles, Mo.) coupled to custom solid state light source drive electronics.

Figure 2A:
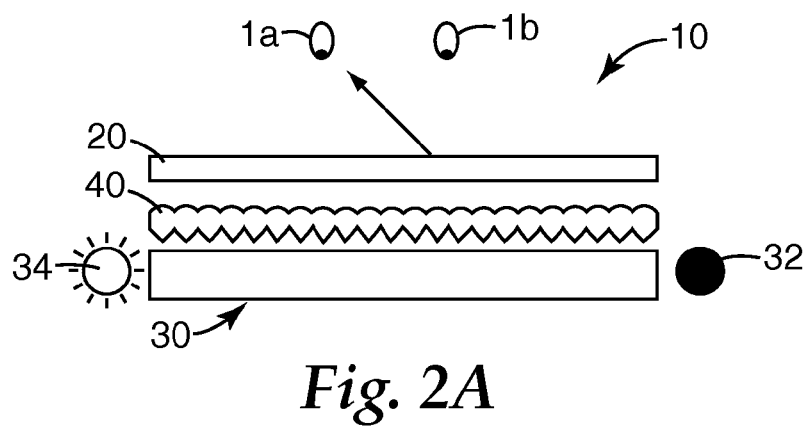
FIGS. 2A and 2B are schematic side views of an illustrative autostereoscopic 3D display apparatus in operation.
Figure 2B:
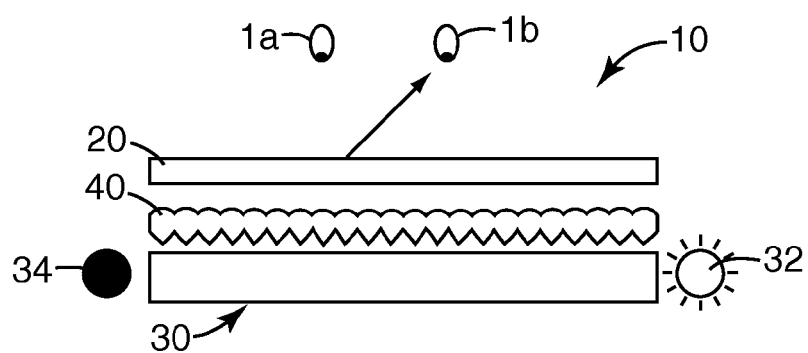

FIGS. 2A and 2B are schematic side views of display apparatus 10 in operation. In FIG. 2A the left eye image solid state light source 34 is illuminated and the right eye image solid state light source 32 is not illuminated. In this state, the light emitted from the left eye image solid state light source 34 transmits through the backlight 30, through the double sided prism sheet 40, and LCD panel 20 providing a left eye image directed toward the left eye 1a of an viewer or observer. In FIG. 2B the right eye image solid state light source 32 is illuminated and the left eye image solid state light source 34 is not illuminated. In this state, the light emitted from the right eye solid state light source 32 transmits through the backlight 30, through the double sided prism sheet 40, and LCD panel 20 providing a right eye image directed toward the right eye 1b of an viewer or observer.

Providing at least 45 left eye images and at least 45 right eye images (alternating between right eye and left eye images and the images are possibly a repeat of the previous image pair) to a viewer per second provides a flicker-free 3D image to the viewer. Accordingly, displaying different right and left viewpoint images either computer rendered or acquired by appropriately positioned still image or video image cameras, alternating in synchronization with the switching of the light sources 32 and 34, enables the viewer to visually fuse the two different images, creating the perception of depth from the flat panel display. An example of a 3D display is described in more detail in U.S. Pat. No. 7,528,893, which is incorporated herein by reference as if fully set forth.

Zero-D Dimming for 3D Displays

In an LED backlight display, such as the 3D display described above, the pixel luminance L is obtained by summing the red, green, and blue (RGB) subpixel values as follows: $L=0.299R+0.587G+0.144B$. Each of the single byte RGB values is between 0 and 255, meaning $0 \leq L \leq 255$. The weighting coefficients for RGB in the L value are chosen based on how much each of the RGB components contribute to the perceived intensity to a viewer, green being the most and blue the least, although different coefficients can be used. The normalized decimal pulse width modulation (PWM) value and LED backlight duty cycle are equal to the following: $PWM=L/255$. Dimming the backlight is implemented by PWM of a signal driving the LEDs in the backlight.

The pixel luminance algorithm of embodiments of the present invention provides correction of such dimming for 3D displays. In particular, in a 3D display the left and right images need special consideration if the luminance for a particular pixel for the left and right image shows high contrast. To maintain a desirable 3D experience, this contrast needs to be maintained. Therefore, the pixel luminance correction algorithm takes into account the difference in left and right pixel luminance value.

Figure 3:
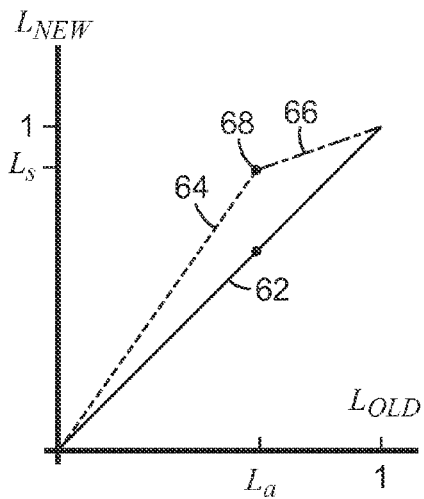
FIG. 3 is a graph illustrating a linear pixel remapping algorithm.

A strategy in pixel remapping is depicted in FIG. 3 where the new or remapped pixel luminance values $L_n$ are plotted against the old pixel luminance values $L_o$. The "no change" situation is indicated by the solid line 62 with unity slope, resulting in new pixel luminance values $L_n$ equal to the old pixel luminance values $L_o$. The dashed line shows a transformation or remapping using two straight lines (segments 64 and 66). The inflection point (68) of the dashed line in FIG. 3 can be based on the average frame luminance $L_a$ or other suitable statistical parameter, resulting in the value $L_s$ on the scale of the new luminance values $L_n$. As shown by line segment 66, the pixel differences for values greater than $L_a$ will be compressed. Thus, a disparity between the left and right views that occurs in this region (line segment 66) is at risk of being lost due to zero-D dimming. Zero-D dimming for 3D displays modifies the inflection point 68 based on the pixel luminance values for the image pixels with luminance disparity. Disparity refers to the difference in image location of an object seen by the left and right eyes, resulting from the eyes' horizontal separation. Disparity is used to extract depth information from the two-dimensional retinal images in stereopsis. In this case disparity refers to the difference in left and right images based on the horizontal separation giving rise to 3D depth perception. In an alternative implementation, the correction algorithm might not take into consideration all disparity values but rather can only factor in those pixel differences that are noticeably different in terms of the human visual system sensitivity.

From FIG. 3 a pull-up factor F can be defined as the ratio $L_s/L_a$. The value of F is greater than one and is set by the display manufacturer or a viewer. The algorithm takes into account the difference between left pixel luminance value $L_l$ and right pixel luminance value $L_r$ for a particular frame of image data to determine a modified pull-up factor $F_m$ in equation (1):

If $L_l$ and $L_r < L_a$ then $F_m = F$

Else $F_m = (1-F)|L_r - L_l| + F$ (1)

The remapping equations of the two straight line segments 64 and 66 are given by equation (2):

$$L_n = F_m L_o \qquad L_o \le L_a \qquad (2)$$

$$L_n = \frac{(1-F_m L_a)L_o + F_m L_a - L_a}{1 - L_a} \qquad L_o > L_a$$

Figure 4:
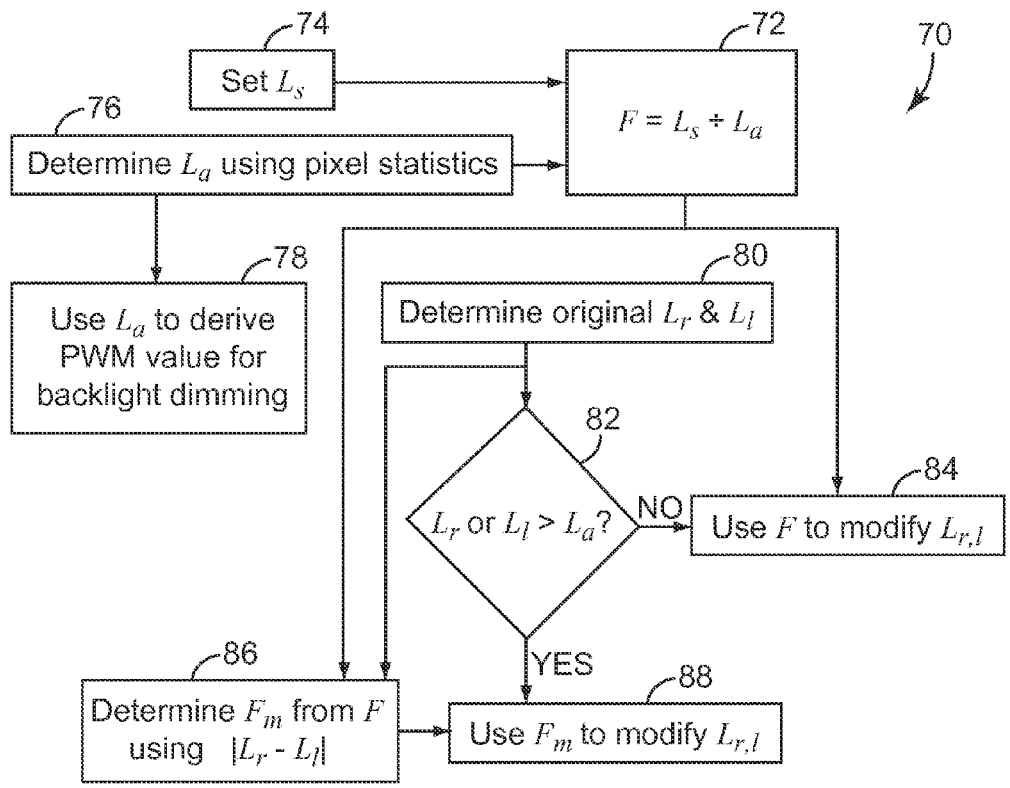
FIG. 4 is a flow chart of a remapping algorithm.

Equations (1) and (2) are implemented electronically. FIG. 4 is a flow chart of a remapping algorithm 70 using the results of equations (1) and (2). Algorithm 70 can be implemented in, for example software executed by a processor such as a controller in synchronization driving element 50, or in a controller using hardware modules or a combination of software and hardware. For example, algorithm 70 along with equations (1) and (2) can be implemented electronically in the Westar VP-7 video adaptor identified above. Table 1 provides sample code to determine disparity values for use in implementing algorithm 70. The code in Table 1 uses the 75th percentile value for the pixels with luminance disparity as the value $L_a$ for illustrative purposes only; different percentile values can be used for $L_a$ depending upon, for example, a particular display device.

Algorithm 70 uses the factors F and $F_m$ to perform the remapping. The factor F is determined from $L_s$ and $L_a$ (step 72). The value $L_s$ is set (step 74), for example as a percentile value of pixels with luminance disparity, and $L_a$ is determined using pixel statistics (step 76), meaning statistical techniques can be applied to the pixel luminance values to determine the optimum or desired value for $L_a$ based upon a visual appearance of the corresponding display or a calculated brightness of the display using various values of $L_a$. The value $L_a$ is also used to derive a PWM value for backlight dimming (step 78). The factor $F_m$ is determined from F using $|L_r - L_l|$ (step 86). The algorithm determines the original right and left pixel luminance values $L_r$ and $L_l$ for a particular frame of image data (step 80) and remaps them. If $L_r$ or $L_l$ is not greater than $L_a$ (step 82), then F is used to modify the right and left pixel luminance values $L_{r,l}$ (step 84). If $L_r$ or $L_l$ is greater than $L_a$ (step 82), then $F_m$ is used to modify the right and left pixel luminance values $L_{r,l}$ (step 88). The term "frame" means a full frame of right and left image data for a particular display or any partial frame of the data on the display.

Although described with respect to a 3D display, the zero-D dimming can be implemented for any multi-view system using right and left image data. An example of a multi-view display is described in U.S. Patent Application Publication No. 2009/0167639, which is incorporated herein by reference as if fully set forth.

TABLE 1

Sample Code to Determine Disparity Values

```
Left_Image = imread('L.bmp');
Right_Image = imread('R.bmp');
Disparity = Left_Image-Right_Image; %For example, a comparison of Left and Right
Images on a pixel by pixel basis
Size_of_Images = size(Left_Image);
Total_number_of_pixels = Size_of_Images(1,1)*Size_of_Images(1,2);
Pixels_with_Disparity_Originals = find(Left_Image~=Right_Image);
Size_of_pixels_with_disparity_Originals = size(Pixels_with_Disparity_Originals);
Number_of_pixels_with_disparity_Originals =
Size_of_pixels_with_disparity_Originals(1,1);
Percentage_of_pixels_with_intact_disparity_Originals =
(Number_of_pixels_with_disparity_Originals/Total_number_of_pixels)*100;
[c d] = hist(Left_Image(Pixels_with_Disparity_Originals),256);
count = 0;
for i = 1:256;
    count = count + c(1,i);
    f(1,i) = count;
end
```

TABLE 1-continued

Sample Code to Determine Disparity Values

```
cutoff = Number_of_pixels_with_disparity_Originals*0.75
%75th percentile point specified but this cutoff point in practice could be any user of
display specified point
for i = 1:256;
    if f(1,i) <= cutoff;
        cutoff_value = i-1;
    end
end
%cutoff_value is the value that determines which values in the images
%receive what pull-up factor
```

The invention claimed is:

1. A method of zero-D dimming for a display using right and left image data, comprising,
receiving right image data having right pixel luminance values;
receiving left image data having left pixel luminance values;
determining a cutoff value based upon which of the right and left image data have disparity; and
modifying, using a controller, the right and left pixel luminance values, comprising:
modifying the right and left pixel luminance values that are below the cutoff value using a first factor based upon an average or a percentile statistics based luminance value; and
modifying the right and left pixel luminance values that are above the cutoff value using a second factor based upon differences between the right pixel luminance values and the left pixel luminance values,
wherein the modifying step maintains a sufficient amount of the disparity between the right and left image data for generating a 3D or multi-view image.

2. The method of claim 1, wherein the determining step comprises using a percentage of the right and left image data having disparity for the cutoff value.

3. The method of claim 1, wherein the second factor comprises the first factor modified based upon the differences between the right pixel luminance values and the left pixel luminance values.

4. The method of claim 1, wherein the modifying step comprises modifying the right and left pixel luminance values for frames of the right and left image data.

5. The method of claim 1, wherein the receiving steps include receiving the right and left image data for a 3D display.

6. The method of claim 1, wherein the receiving steps include receiving the right and left image data for a multi-view display.

7. A 3D display having zero-D dimming, comprising:
a liquid crystal display panel;
a backlight having light sources capable of being modulated between right image data and left image data;
a double sided prism film disposed between the liquid crystal display panel and the backlight; and
a controller, coupled to the backlight, configured to:
receive right image data having right pixel luminance values;
receive left image data having left pixel luminance values;
determine a cutoff value based upon which of the right and left image data have disparity; and
modify the right and left pixel luminance values, comprising:
modify the right and left pixel luminance values that are below the cutoff value using a first factor based upon an average or a percentile statistics based luminance value; and
modify the right and left pixel luminance values that are above the cutoff value using a second factor based upon differences between the right pixel luminance values and the left pixel luminance values,
wherein the modifying maintains a sufficient amount of the disparity between the right and left image data for generating a 3D image.

8. The 3D display of claim 7, wherein the controller is configured to determine the cutoff value using a percentage of the right and left image data having disparity.

9. The 3D display of claim 7, wherein the second factor comprises the first factor modified based upon the differences between the right pixel luminance values and the left pixel luminance values.

10. The 3D display of claim 7, wherein the controller is configured to modify the right and left pixel luminance values for frames of the right and left image data.

* * * * *